(12) United States Patent
Wang et al.

(10) Patent No.: US 11,997,328 B2
(45) Date of Patent: May 28, 2024

(54) HTTP REQUEST TRANSMISSION METHOD AND DEVICE

(71) Applicants: Huawei Technologies Co., Ltd., Shenzhen (CN); PEKING UNIVERSITY, Beijing (CN)

(72) Inventors: Hao Wang, Shanghai (CN); Zheng Hu, Shenzhen (CN); Chenren Xu, Beijing (CN); Xingmin Guo, Shanghai (CN); Xiaojin Li, Shenzhen (CN); Zhiyong Yan, Shenzhen (CN)

(73) Assignees: Huawei Technologies Co., Ltd., Shenzhen (CN); PEKING UNIVERSITY, Beijing (CN)

( * ) Notice: Subject to any disclaimer, the term of this patent is extended or adjusted under 35 U.S.C. 154(b) by 0 days.

(21) Appl. No.: 17/782,157

(22) PCT Filed: Nov. 18, 2020

(86) PCT No.: PCT/CN2020/129893
§ 371 (c)(1),
(2) Date: Jun. 2, 2022

(87) PCT Pub. No.: WO2021/109872
PCT Pub. Date: Jun. 10, 2021

(65) Prior Publication Data
US 2023/0027525 A1    Jan. 26, 2023

(30) Foreign Application Priority Data
Dec. 3, 2019  (CN) .......................... 201911223477.5

(51) Int. Cl.
*H04N 21/238*    (2011.01)
*H04L 67/02*    (2022.01)
(Continued)

(52) U.S. Cl.
CPC .......... *H04N 21/238* (2013.01); *H04L 67/02* (2013.01); *H04N 21/2665* (2013.01);
(Continued)

(58) Field of Classification Search
CPC ............ H04N 21/238; H04N 21/2665; H04N 21/4126; H04N 21/43637; H04N 21/6131;
(Continued)

(56) References Cited

U.S. PATENT DOCUMENTS

2014/0247885 A1    9/2014  Brueck et al.
2018/0077592 A1    3/2018  Kim et al.
(Continued)

FOREIGN PATENT DOCUMENTS

CN    102484652 A    5/2012
CN    102763428 A    10/2012
(Continued)

OTHER PUBLICATIONS

Zhang et al., "Partial Overlapping Chunk Based Mutiple-Path Transmission," Total 2 pages (2017). With English abstract.
(Continued)

*Primary Examiner* — Tan Doan
(74) *Attorney, Agent, or Firm* — Leydig, Voit & Mayer, Ltd.

(57) ABSTRACT

Disclosed are a hypertext transfer protocol (HTTP) request transmission method and device. The HTTP request transmission method and device resolve a problem that data finally obtained through splicing is invalid because dividing an original HTTP request into a plurality of HTTP requests to pull data from different content distribution network (CDN) servers may cause inconsistency of the pulled data. When an electronic device needs to download data from a plurality of CDN servers, an overlapping range may be
(Continued)

designed for byte ranges allocated to the different CDN servers. This means that the electronic device downloads data in the overlapping range from all the different CDN servers. Therefore, this part of data is used to check consistency of the data pulled from the different CDN servers. When determining that the data pulled from the different CDN servers is consistent, the electronic device may splice the data to obtain finally required data.

18 Claims, 3 Drawing Sheets

(51) Int. Cl.
*H04N 21/2665* (2011.01)
*H04N 21/41* (2011.01)
*H04N 21/4363* (2011.01)
*H04N 21/61* (2011.01)
*H04N 21/845* (2011.01)

(52) U.S. Cl.
CPC ... *H04N 21/4126* (2013.01); *H04N 21/43637* (2013.01); *H04N 21/6131* (2013.01); *H04N 21/8456* (2013.01)

(58) Field of Classification Search
CPC ........... H04N 21/8456; H04N 21/4346; H04N 21/44016; H04N 21/6581; H04N 21/26208; H04N 21/438; H04L 67/02
USPC .......................................................... 709/203
See application file for complete search history.

(56) References Cited

U.S. PATENT DOCUMENTS

| | | | |
|---|---|---|---|
| 2018/0167436 A1 | 6/2018 | Han et al. | |
| 2018/0262419 A1* | 9/2018 | Ludin | ..................... H04L 45/24 |
| 2019/0082374 A1* | 3/2019 | Cao | ........................ H04W 40/12 |
| 2019/0182360 A1* | 6/2019 | Shribman | ........... H04L 67/1063 |
| 2019/0354819 A1 | 11/2019 | Fradkin et al. | |

FOREIGN PATENT DOCUMENTS

| | | |
|---|---|---|
| CN | 103200606 A | 7/2013 |
| CN | 104067594 A | 9/2014 |
| CN | 104205771 A | 12/2014 |
| CN | 104427353 A | 3/2015 |
| CN | 105094960 A | 11/2015 |
| CN | 105100964 A | 11/2015 |
| CN | 106341186 A | 1/2017 |
| CN | 106376099 A | 2/2017 |
| CN | 106537856 A | 3/2017 |
| CN | 107181676 A | 9/2017 |
| CN | 108282543 A | 7/2018 |
| CN | 108702542 A | 10/2018 |
| CN | 109660496 A | 4/2019 |
| CN | 109729519 A | 5/2019 |
| CN | 111093110 A | 5/2020 |
| EP | 3454566 A1 | 3/2019 |
| JP | 2013520119 A | 5/2013 |
| JP | 2014529970 A | 11/2014 |
| JP | 2016504005 A | 2/2016 |
| JP | 2017518654 A | 7/2017 |
| JP | 2020521351 A | 7/2020 |
| WO | 2016166880 A1 | 10/2016 |

OTHER PUBLICATIONS

Bagnulo et al., "Threat Analysis for TCP Extensions for Multipath Operation with Multiple Addresses," Internet Engineering Task Force (IETF), Request for comments: 6181, Total 17 pages, Internet Engineering Task Force, Reston, Virginia (Mar. 2011).

Chen Min, "Streaming Media Transmission System Based on Bandwidth Aggregation," Total 2 pages (2014). With English abstract.

Ford et al., "Architectural Guidelines for Multipath TCP Development," Internet Engineering Task Force (IETF), Request for comments: 6182, Total 28 pages, Internet Engineering Task Force, Reston, Virginia (Mar. 2011).

Nikravesh et al., "MP-H2: A Client-only Multipath Solution for HTTP/2," Total 16 pages (Oct. 21-25, 2019).

Raiciu et al., "Coupled Congestion Control for Multipath Transport Protocols," Internet Engineering Task Force (IETF), Request for comments: 6356, Total 12 pages, Internet Engineering Task Force, Reston, Virginia (Oct. 2011).

Juhoon Kim et al., Multi-source Multipath HTTP (mHTTP): A Proposal, Dec. 10, 2013, 12 pages.

Ford et al., "TCP Extensions for Multipath Operation with Multiple Addresses," Internet Engineering Task Force (IETF), Request for comments: 6824, Total 64 pages, Internet Engineering Task Force, Reston, Virginia (2013).

Scharf et al., "Multipath TCP (MPTCP) Application Interface Considerations," Internet Engineering Task Force (IETF), Request for comments: 6897, Total 31 pages, Internet Engineering Task Force, Reston, Virginia (Mar. 2013).

Bagnulo et al., "Analysis of Residual Threats and Possible Fixes for Multipath TCP (MPTCP)," Internet Engineering Task Force (IETF), Request for comments: 7430, Total 19 pages, Internet Engineering Task Force, Reston, Virginia (Jul. 2015).

Bonavenure et al., "Use Cases and Operational Experience with Multipath TCP," Internet Engineering Task Force (IETF), Request for comments: 8041, Total 30 pages, Internet Engineering Task Force, Reston, Virginia (Jan. 2017).

\* cited by examiner

HTTP REQUEST TRANSMISSION METHOD AND DEVICE

CROSS-REFERENCE TO RELATED APPLICATIONS

This application is a National Stage of International Application No. PCT/CN2020/129893, filed on Nov. 18, 2020, which claims priority to Chinese Patent Application No. 201911223477.5, filed on Dec. 3, 2019. Both of the aforementioned applications are hereby incorporated by reference in their entireties.

TECHNICAL FIELD

This application relates to the field of electronic devices, and in particular, to a hypertext transfer protocol (HTTP) request transmission method and a device.

BACKGROUND

As electronic technologies increasingly develop, an electronic device such as a mobile phone or a tablet computer allows simultaneous use of a wireless fidelity (Wi-Fi) network and a cellular network to improve communication experience. For example, when a user watches a video on the mobile phone, the user can use both the Wi-Fi network and the cellular network. This can provide larger aggregated bandwidth, so that a video download rate is higher, less frame freezing occurs, and video playing is smoother.

To implement simultaneous use of the Wi-Fi network and the cellular network, a multipath hypertext transfer protocol (MPHTTP) technology is proposed in the industry. In the MPHTTP technology, for an original HTTP request initiated by an application (APP), the electronic device may divide the original HTTP request into a plurality of (for example, two) HTTP requests based on a byte range carried in the original HTTP request, and then send the plurality of HTTP requests to corresponding content distribution network (CDN) servers through the Wi-Fi network and the cellular network, to pull corresponding data from the CDN servers. This provides the larger aggregated bandwidth.

Generally, CDN servers that provide content access are different in different networks. If the electronic device pulls data from a same CDN server based on the plurality of HTTP requests obtained through division, a download speed may be very low or even access may fail due to cross-network access. Therefore, to enable the user to obtain optimal service experience, the electronic device usually pulls data from different CDN servers based on the plurality of HTTP requests obtained through division. For example, as shown in FIG. 1, a byte range in an original HTTP request is 1 to 200, a CDN server that provides content access in a cellular network is a CDN 1, and a CDN server that provides content access in a Wi-Fi network is a CDN 2. An electronic device may divide the original HTTP request into two HTTP requests: an HTTP request 1 carrying a byte range 1 to 100 and an HTTP request 2 carrying a byte range 101 to 200. The electronic device sends the HTTP request 1 to the CDN 1 through the cellular network, to pull data whose byte range is 1 to 100 from the CDN 1; and sends the HTTP request 2 to the CDN 2 through the Wi-Fi network, to pull data whose byte range is 101 to 200 from the CDN 2. Then, the electronic device splices the data obtained from the CDN 1 and the data obtained from the CDN 2, to obtain data requested to be pulled based on the original HTTP request.

However, dividing an original HTTP request into a plurality of HTTP requests to pull data from different CDN servers may cause inconsistency of the pulled data. Consequently, data finally obtained through splicing is invalid.

SUMMARY

Embodiments of this application provide an HTTP request transmission method and a device, to resolve a problem that data finally obtained through splicing is invalid because dividing an original HTTP request into a plurality of HTTP requests to pull data from different CDN servers may cause inconsistency of the pulled data.

To achieve the foregoing objectives, the following technical solutions are used in this application.

According to a first aspect, an embodiment of this application provides an HTTP request transmission method. The method may be applied to an electronic device. The method may include: The electronic device allocates a first byte range to a first CDN server and allocates a second byte range to a second CDN server based on a byte range of to-be-requested data. There is an overlapping range between the first byte range and the second byte range. The electronic device sends a first HTTP request to the first CDN server based on the first byte range, and sends a second HTTP request to the second CDN server based on the second byte range. The first HTTP request is at least used to download first data from the first CDN server. The second HTTP request is at least used to download second data from the second CDN server. The first data and the second data each are data whose byte range is the overlapping range and are used to check consistency between data downloaded from the first CDN server and data downloaded from the second CDN server.

According to the technical solution, when the electronic device needs to download data from a plurality of CDN servers, an overlapping range may be designed for byte ranges allocated to different CDN servers, which means that the electronic device downloads data in the overlapping range from all the different CDN servers. This part of data is used to check the consistency between data pulled from the different CDN servers. Then, when determining that the data pulled from the different CDN servers is consistent, the electronic device may splice the data to obtain finally required data. In this way, an MPHTTP technology is used to obtain larger aggregated bandwidth, and ensure data splicing validity and normal service running.

In a possible implementation, an end byte of requested data identified by the first byte range is greater than a start byte of requested data identified by the second byte range. In other words, bytes with smaller numbers in the second byte range partially overlap bytes with larger numbers in the first byte range.

In another possible implementation, that the electronic device allocates a first byte range to a first content distribution network CDN server and allocates a second byte range to a second CDN server based on a byte range of to-be-requested data may include: The electronic device allocates a third byte range to the first CDN server and allocates a fourth byte range to the second CDN server based on the byte range of the to-be-requested data. There is no overlapping range between the third byte range and the fourth byte range. An intersection between the third byte range and the fourth byte range is the byte range of the to-be-requested data. The electronic device adjusts, based on a predefined initial value, an end byte of requested data identified by the third byte range, to obtain the first byte range, and uses the fourth byte range as the second byte range. In this way, corresponding byte ranges are first allocated to different CDN servers, so that the allocated byte ranges can meet a specific performance requirement, for example, a requirement that a data download rate is optimal or a requirement that performance of the different CDN servers can be balanced.

In another possible implementation, the method may further include: The electronic device receives the first data from the first CDN server, and receives the second data from the second CDN server. The electronic device checks, based on the first data and the second data, the consistency between the data downloaded from the first CDN server and the data downloaded from the second CDN server.

In another possible implementation, before the electronic device checks, based on the first data and the second data, the consistency between the data downloaded from the first CDN server and the data downloaded from the second CDN server, the method may further include: The electronic device obtains a proportion of padding data in the first data and the second data. That the electronic device checks, based on the first data and the second data, the consistency between the data downloaded from the first CDN server and the data downloaded from the second CDN server may include: When determining that the proportion of the padding data is less than a threshold, the electronic device checks, based on the first data and the second data, the consistency between the data downloaded from the first CDN server and the data downloaded from the second CDN server. Before the data consistency check is performed, the proportion of the padding data in the to-be-compared data is first determined. Only when the proportion meets a specific condition, the data consistency check is performed, to ensure accuracy of the data consistency check.

In another possible implementation, the method may further include: When determining that the proportion of the padding data is greater than the threshold, the electronic device adjusts the end byte of the requested data identified by the first byte range, and increases the overlapping range between the first byte range and the second byte range, at least to download third data from the first CDN server and download fourth data from the second CDN server. When determining that a proportion of padding data in the third data and the fourth data is less than the threshold, the electronic device checks, based on the third data and the fourth data, the consistency between the data downloaded from the first CDN server and the data downloaded from the second CDN server. When determining that the proportion of the padding data in the third data and the fourth data is greater than the threshold, the electronic device continues to increase the overlapping range between the first byte range and the second byte range, and checks, until a proportion of padding data in data that is downloaded from the first CDN server and downloaded from the second CDN server and that has a same byte range is less than the threshold, the consistency between the data downloaded from the first CDN server and the data downloaded from the second CDN server. In this way, when it is determined that the proportion of the padding data in the to-be-compared data is greater than the threshold, a size of the overlapping area is increased, so that other data can be obtained to check the data consistency.

In another possible implementation, the first HTTP request includes a resource descriptor and the first byte range; the first HTTP request includes the resource descriptor and the byte range of the to-be-requested data; or the first HTTP request includes the resource descriptor. The second HTTP request includes the resource descriptor and the second byte range. The resource descriptor is used to describe the to-be-requested data.

In another possible implementation, when the first HTTP request includes the resource descriptor and the byte range of the to-be-requested data, or the first HTTP request includes the resource descriptor, the method may further include: When the electronic device checks that the data downloaded from the first CDN server is consistent with the data downloaded from the second CDN server, the electronic device sends a reset packet to the first CDN server, and splices the data downloaded from the first CDN server and the data downloaded from the second CDN server, to obtain the to-be-requested data; or when the electronic device checks that the data downloaded from the first CDN server is inconsistent with the data downloaded from the second CDN server, the electronic device sends a reset packet to the second CDN server, and downloads the to-be-requested data from the first CDN server. The reset packet is used to indicate to stop returning data to the electronic device.

In another possible implementation, when the first HTTP request includes the resource descriptor and the first byte range, the method may further include: When the electronic device checks that the data downloaded from the first CDN server is consistent with the data downloaded from the second CDN server, the electronic device splices the data downloaded from the first CDN server and the data downloaded from the second CDN server, to obtain the to-be-requested data; or when the electronic device checks that the data downloaded from the first CDN server is inconsistent with the data downloaded from the second CDN server, the electronic device sends a third HTTP request to the first CDN server, and sends a reset packet to the second CDN server. The third HTTP request is used to request to download data that is in the to-be-requested data and that is not identified by the first byte range. The reset packet is used to indicate to stop returning data to the electronic device.

When it is checked that the data downloaded from the first CDN server is consistent with the data downloaded from the second CDN server, the data downloaded from the first CDN server may be spliced for use. When it is checked that the data downloaded from the first CDN server is inconsistent with the data downloaded from the second CDN server, it indicates that data obtained through splicing may be invalid when the data downloaded from the first CDN server is spliced with the data downloaded from the second CDN server. The electronic device may download the to-be-requested data from the first CDN server, and does not use the data returned by the second CDN server.

In another possible implementation, that the electronic device sends a first HTTP request to the first CDN server includes: The electronic device sends the first HTTP request to the first CDN server through a first network. That the electronic device sends a second HTTP request to the second CDN server includes: The electronic device sends the second HTTP request to the second CDN server through a second network. The first network is different from the second network.

In another possible implementation, the first network is a cellular network, and the second network is a Wi-Fi network.

In another possible implementation, that the electronic device checks, based on the first data and the second data, the consistency between the data downloaded from the first CDN server and the data downloaded from the second CDN server may include: The electronic device compares the first data with the second data in a binary comparison manner. When binary comparison between the first data and the second data is consistent, the electronic device determines that the data downloaded from the first CDN server is consistent with the data downloaded from the second CDN server. When binary comparison between the first data and the second data is inconsistent, the electronic device determines that the data downloaded from the first CDN server is inconsistent with the data downloaded from the second CDN server.

According to a second aspect, an embodiment of this application provides an electronic device. The electronic device may include a processor, a memory, and a communications interface. The memory and the communications interface are coupled to the processor. The communications interface is configured to communicate with another device. The another device includes a first CDN server and a second CDN server. The memory is configured to store computer program code. The computer program code includes computer instructions. When the computer instructions are executed by the electronic device, the electronic device is enabled to perform the HTTP request transmission method according to any one of the first aspect or the possible implementations of the first aspect.

According to a third aspect, an embodiment of this application provides a computer-readable storage medium, including computer software instructions. When the computer software instructions are run on an electronic device, the electronic device is enabled to perform the HTTP request transmission method according to any one of the first aspect or the possible implementations of the first aspect.

According to a fourth aspect, an embodiment of this application provides a computer program product. When the computer program product runs on a computer, the computer is enabled to perform the HTTP request transmission method according to any one of the first aspect or the possible implementations of the first aspect.

According to a fifth aspect, an embodiment of this application provides an apparatus. The apparatus has a function of implementing behavior of the electronic device in the methods in the foregoing aspects. The function may be implemented by hardware, or may be implemented by hardware by executing corresponding software. The hardware or software includes one or more modules corresponding to the foregoing function, for example, an allocation unit or module, a sending unit or module, a receiving unit or module, and an obtaining unit or module.

According to a sixth aspect, an embodiment of this application provides an HTTP request transmission system. The system includes at least an electronic device, a first CDN server, and a second CDN server. The electronic device is configured to: allocate a first byte range to the first CDN server, and allocate a second byte range to the second CDN server based on a byte range of to-be-requested data, where there is an overlapping range between the first byte range and the second byte range; and send a first HTTP request to the first CDN server based on the first byte range, and send a second HTTP request to the second CDN server based on the second byte range. The first HTTP request is at least used to download first data from the first CDN server. The second HTTP request is at least used to download second data from the second CDN server. The first data and the second data are data whose byte ranges is the overlapping range, and are used to check consistency between data downloaded from the first CDN server and data downloaded from the second CDN server. The first CDN server is configured to: receive the first HTTP request from the electronic device, and return the data to the electronic device. The data includes at least the first data. The second CDN server is configured to: receive the second HTTP request from the electronic device, and return the data to the electronic device. The data includes at least the second data.

In a possible implementation, the first CDN server may be a CDN server located in a first network, and the second CDN server may be a server located in a second network. The first network is different from the second network. For example, the first network is a cellular network, and the second network is a Wi-Fi network.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one same embodiment. Further, the technical features, the technical solutions, and the beneficial effects described in the embodiments may be combined in any appropriate manner. A person skilled in the art understands that an embodiment may be implemented without one or more specific technical features, technical solutions, or beneficial effects in a specific embodiment. In other embodiments, additional technical features and beneficial effects may be further identified in a specific embodiment that does not reflect all the embodiments.

DESCRIPTION OF EMBODIMENTS

A term such as "example" or "for example" is used for representing an example, an example illustration, or a description below. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

Currently, an MPHTTP technology is proposed in the industry to implement simultaneous use of a plurality of networks, for example, a Wi-Fi network and a cellular network, to improve communication experience. In the MPHTTP technology, an original HTTP request initiated by an app is divided into a plurality of HTTP requests based on a byte range carried in the original HTTP request. The plurality of HTTP requests are sent to corresponding CDN servers through a Wi-Fi network and a cellular network, to obtain corresponding data from the CDN servers. This provides larger aggregated bandwidth.

Generally, CDN servers that provide content access are different in different networks. If the electronic device pulls data from a same CDN server based on the plurality of HTTP requests obtained through division, a download speed may be very low or even access may fail due to cross-network access. For example, with reference to an example shown in FIG. 1, if an electronic device sends an HTTP request 2 to a CDN 1 through a Wi-Fi network, a corresponding data download speed may be very low or even access to the corresponding CDN server may fail due to cross-network access. For example, with reference to test data shown in Table 1, it can be seen that, for iQIYI, if data is downloaded from a CDN server in a Wi-Fi network through the Wi-Fi network, a data download speed may reach 10 MB/s; and if data is downloaded from a CDN server in another network, for example, a long term evolution (LTE) network, through the Wi-Fi network, a download speed is 0, that is, access to the CDN server fails. The same is true for bilibili. For Tencent, if data is downloaded from a CDN server in a Wi-Fi network through the Wi-Fi network, a data download speed may reach 8 MB/s; and if data is downloaded from a CDN server in an LTE network through the Wi-Fi network, a download speed is 0.6 MB/s, and the download speed is very slow. The same is true for Youku.

TABLE 1

| Application & Used network | Speed of downloading data from a CDN server in a local network (unit: MB/s) | Speed of downloading data from a CDN server in another network (unit: MB/s) |
| --- | --- | --- |
| iQIYI LTE | 3 | 8 |
| iQIYI Wi-Fi | 10 | 0 |
| Tencent LTE | 3 | 3 |
| Tencent Wi-Fi | 8 | 0.6 |
| Youku LTE | 5 | 5 |
| Youku Wi-Fi | 5 | 1.5 |
| Bilibili LTE | 6 | 6 |
| Bilibili Wi-Fi | 6 | 0 |

Figure 1:
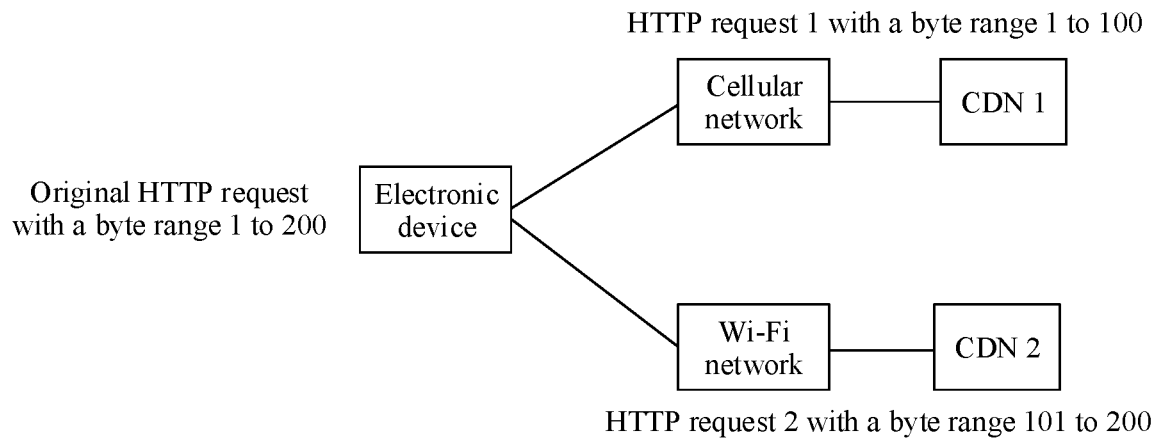
FIG. 1 is a schematic diagram of HTTP request transmission in the conventional technology.

Therefore, to enable the user to obtain optimal service experience, the plurality of HTTP requests obtained through division by the electronic device are used to pull the data from the corresponding CDN servers in transmitted networks, that is, different HTTP requests are used to pull the data from different CDN servers. For example, as shown in FIG. 1, an HTTP request 1 is used to pull data from the CDN 1, and the HTTP request 2 is used to pull data from a CDN 2. Then, after splicing the data pulled from the different CDN servers, the electronic device obtains data to be pulled based on the original HTTP request.

However, if the electronic device pulls the data from the different CDN servers based on the plurality of HTTP requests obtained through division, the data finally obtained through splicing may be invalid because the pulled data is inconsistent. For example, with reference to the example shown in FIG. 1, data whose byte range is 1 to 100 is pulled from the CDN 1, and data whose byte range is 101 to 200 is pulled from the CDN 2. When the electronic device needs to splice the data, the data obtained through splicing may be invalid due to upgrade inconsistency of CDN servers. As a result, a service cannot run normally, for example, the user cannot watch a video normally. Especially in an environment in which there are many domain name system (DNS) hijackings on the CDN servers, there is a higher probability that the data obtained through splicing is invalid.

Therefore, when the electronic device uses the MPHTTP technology, it is necessary to check consistency of the data pulled from the plurality of CDN servers, to ensure normal service running.

Generally, for many video services, after sending corresponding HTTP requests to CDN servers, the electronic device requests from the CDN servers, a description information manifest file of data requested by the HTTP requests. The description information manifest file includes description information such as last modified time, a timestamp, and a tag. However, none of the description information can be used to prove whether the data pulled from the plurality of CDN servers is consistent.

The embodiments of this application provide an HTTP request transmission method. The method may be applied to an electronic device. When the electronic device needs to download data from a plurality of CDN servers, an overlapping range is designed for byte ranges allocated to the different CDN servers. This means that the electronic device downloads data in the overlapping range from all the different CDN servers, and this part of data may be used to check data consistency of the data pulled from the different CDN servers. When determining that the data pulled from the different CDN servers is consistent, the electronic device may splice the data to obtain the finally required data. In this way, an MPHTTP technology is used to obtain larger aggregated bandwidth, and ensure data splicing validity and normal service running.

The following describes implementations of the embodiments of this application in detail with reference to accompanying drawings.

Figure 2:
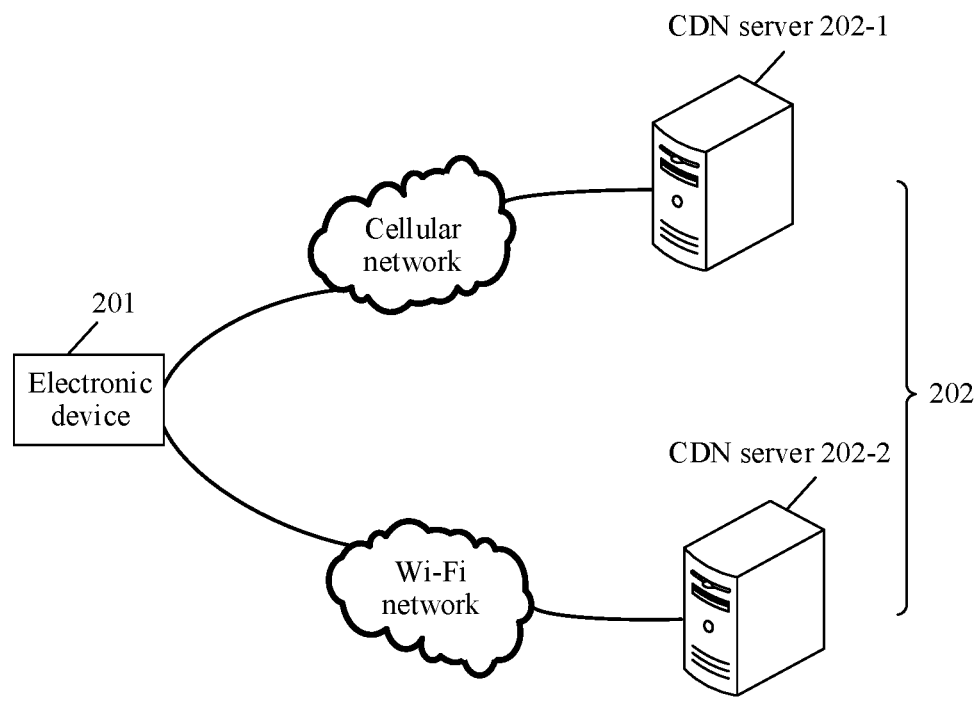
FIG. 2 is a simplified schematic diagram of a system architecture according to an embodiment of this application.

FIG. 2 is a schematic composition diagram of a system architecture according to an embodiment of this application. As shown in FIG. 2, the system architecture includes at least an electronic device 201 and a plurality of CDN servers 202.

The CDN server 202 is a server that is deployed in a network and that is configured to provide content access. The electronic device 201 may send an HTTP request to the CDN server 202 through a network, to download corresponding data from the CDN server 202.

In this embodiment of this application, the electronic device 201 may download corresponding data from the plurality of CDN servers 202 by using an MPHTTP technology based on an original HTTP request initiated by an app on the electronic device 201. This provides larger aggregated bandwidth and improves communication experience. For example, the electronic device 201 may allocate different byte ranges to the plurality of CDN servers 202 based on a byte range carried in the original HTTP request. Then, the electronic device 201 sends, through networks, corresponding HTTP requests to corresponding CDN servers based on the byte ranges allocated to the plurality of CDN servers 202, so that the plurality of CDN servers 202 return corresponding data to the electronic device 201 based on the received HTTP requests.

In the different byte ranges allocated by the electronic device 201 to the plurality of CDN servers 202, there is an overlapping range between byte ranges used to identify continuous data. Therefore, the electronic device 201 may pull same data (the same data is data in the byte ranges having the overlapping range) from the different CDN servers, to check consistency of the data pulled from the different CDN servers. When the data consistency check succeeds, the electronic device 201 may continue to download corresponding data from the different CDN servers. If the data consistency check fails, the electronic device 201 stops downloading corresponding data from the plurality of CDN servers at the same time, and downloads data from only some CDN servers (for example, one CDN server). This provides the larger aggregated bandwidth, and ensures data splicing validity and normal service running.

In this embodiment, "a plurality of" may refer to two or more than two. The plurality of CDN servers 202 may be located in a same network, or may be located in different networks. For example, the system architecture includes two CDN servers 202: a CDN server 202-1 and a CDN server 202-2. The CDN server 202-1 and the CDN server 202-2 may be different CDN servers located in a same network (for example, a Wi-Fi network or a cellular network). The CDN server 202-1 and the CDN server 202-2 may alternatively be CDN servers located in different networks. For example, the CDN server 202-1 is located in a cellular network, and the CDN server 202-2 is located in a Wi-Fi network. FIG. 2 shows an example in which the system architecture includes two CDN servers 202: a CDN server 202-1 and a CDN server 202-2, the CDN server 202-1 is located in a Wi-Fi network, and the CDN server 202-2 is located in a cellular network. In addition, in this embodiment, the cellular network may be a network using any mobile communications technology, for example, a 3rd generation mobile communications technology (3G) network, a 4th generation mobile communications technology (4G) network (or an LTE network), a 5th generation mobile communications technology (5G) network, or a next-generation mobile communications network.

For example, based on the schematic diagram of the system architecture shown in FIG. 2, in some embodiments, an example in which a user watches a video by using a video application on the electronic device 201 is used. The video application on the electronic device 201 initiates an original HTTP request. A byte range carried in the original HTTP request is [1, 200]. The electronic device 201 may allocate corresponding byte ranges to the CDN server 202-1 and the CDN server 202-2 based on the byte range carried in the original HTTP request. There is an overlapping range between a byte range allocated to the CDN server 202-1 and a byte range allocated to the CDN server 202-2. For example, the byte range allocated to the CDN server 202-1 is [1, 110], the byte range allocated to the CDN server 202-2 is [101,200], and there is an overlapping range [101, 110] between the byte range allocated to the CDN server 202-1 and the byte range allocated to the CDN server 202-2.

The electronic device 201 may send an HTTP request 1 to the CDN server 202-1 through the cellular network based on the byte range allocated to the CDN server 202-1, to download video data whose byte range is [101, 110] from the CDN server 202-1. The electronic device 201 may also send an HTTP request 2 to the CDN server 202-2 through the Wi-Fi network based on the byte range allocated to the CDN server 202-2, to download video data whose byte range is [101, 110] from the CDN-2. It may be understood that the electronic device 201 downloads, from the CDN server 202-1, the video data whose byte range is [101, 110], and also downloads, from the CDN server 202-2, the video data whose byte range is [101, 110]. Based on the video data whose byte range is [101, 110], downloaded from the CDN server 202-1 and the video data whose byte range is [101, 110], downloaded from the CDN server 202-2, the electronic device 201 may check whether data downloaded from different CDN servers is consistent. When the data consistency check succeeds, the electronic device 201 may splice video data downloaded from the CDN server 202-1 and video data downloaded from the CDN server 202-2, to obtain the finally required video data. If the data consistency check fails, the electronic device 201 stops downloading data from the two CDN servers at the same time, and downloads data from only one CDN server. For example, the electronic device 201 may stop downloading data from the CDN server 202-2, and download remaining video data only from the CDN server 202-1.

For example, the electronic device 201 in this embodiment of this application may be a device, such as a mobile phone, a tablet computer, a desktop computer, a laptop computer, a handheld computer, a notebook computer, an ultra-mobile personal computer (UMPC), a netbook, a cellular phone, a personal digital assistant (PDA), a wearable device, an augmented reality (AR) device/a virtual reality (VR) device, or a media player. A specific form of the device is not particularly limited in this embodiment of this application.

Figure 3:
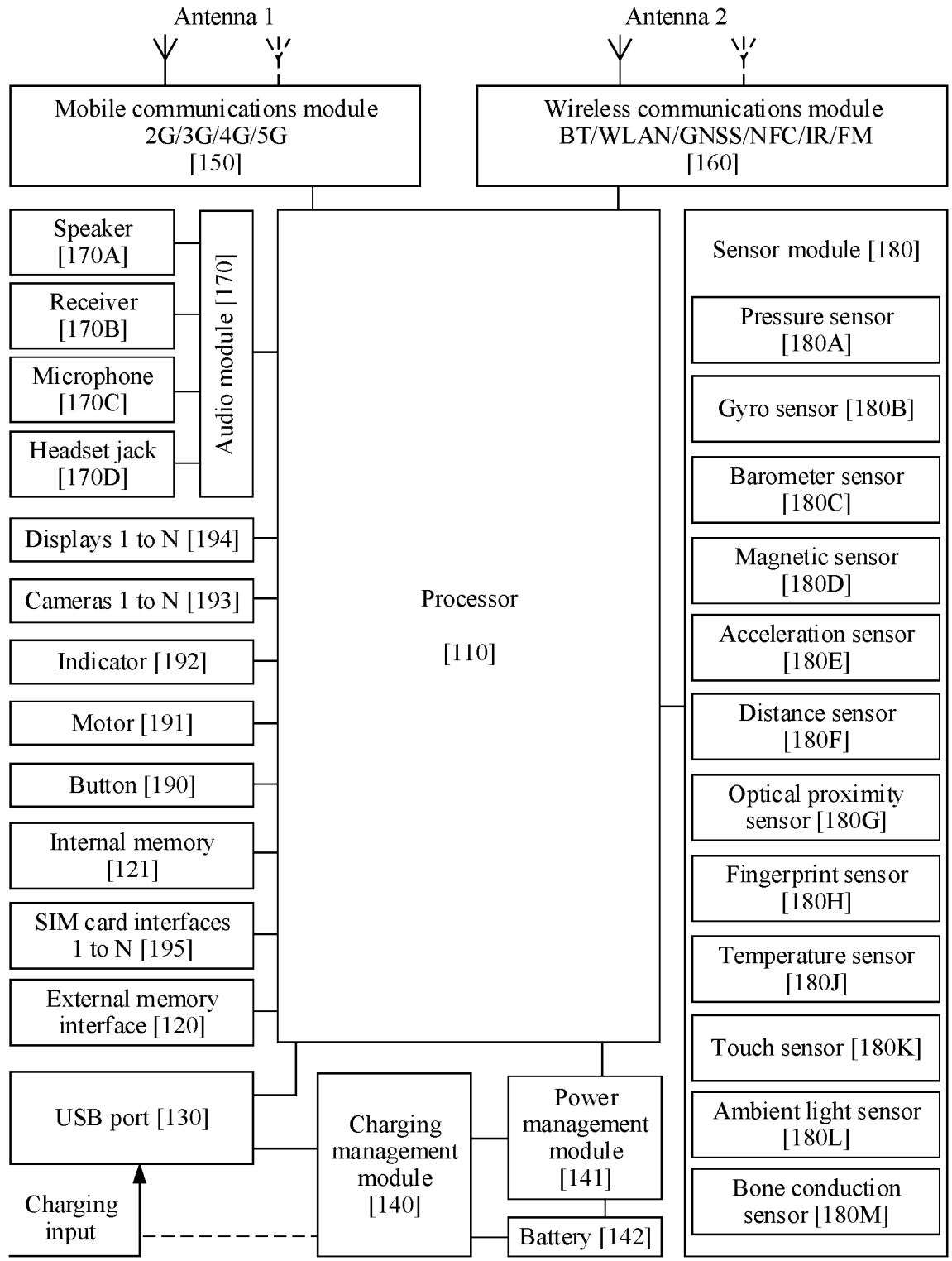
FIG. 3 is a schematic composition diagram of an electronic device according to an embodiment of this application.

FIG. 3 is a schematic diagram of a structure of an electronic device according to an embodiment of this application. As shown in FIG. 3, the electronic device may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The sensor module 180 may include a pressure sensor 180A, a gyro sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device. In some other embodiments, the electronic device may include more or fewer components than those shown in the figure, or some components may be spliced, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, an SIM interface, a USB port, and/or the like.

The charging management module 140 is configured to receive charging input from a charger. The charger may be a wireless charger or a wired charger. The charging management module 140 may further supply power to the electronic device through the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communications module 160, and the like. In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device may be configured to cover one or more communication bands. Different antennas may be further reused, to improve antenna utilization. For example, the antenna 1 may be reused as a diversity antenna of a wireless local area network. In some other embodiments, the antenna may be used in combination with a tuning switch.

The mobile communications module 150 may provide a solution that is for wireless communication including 2G/3G/4G/5G and the like and that is applied to the electronic device. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some functional modules in the mobile communications module 150 may be disposed in the processor 110. In some embodiments, at least some functional modules in the mobile communications module 150 may be disposed in a same device as at least some modules in the processor 110. For example, in this embodiment of this application, the mobile communications module 150 may be configured to send an HTTP request, and the HTTP request is used to request to download corresponding data from a CDN server. The mobile communications module 150 may be further configured to receive the corresponding data from the CDN server.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another functional module.

The wireless communications module 160 may provide wireless communication solutions, applied to the electronic device, for example, a wireless local area network (WLAN) (such as a wireless fidelity (Wi-Fi) network), Bluetooth (BT), a global navigation satellite system (GNSS), frequency modulation (FM), near field communication (NFC), and infrared (IR) technologies. The wireless communications module 160 may be one or more components integrated into at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2. For example, in this embodiment of this application, the wireless communications module 160 may be configured to send an HTTP request, and the HTTP request is used to request to download corresponding data from a CDN server. The wireless communications module 160 may be further configured to receive the corresponding data from the CDN server.

In some embodiments, the antenna 1 of the electronic device is coupled to the mobile communications module 150, and the antenna 2 is coupled to the wireless communications module 160, so that the electronic device may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode or an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device may include one or N displays 194, where N is a positive integer greater than 1.

The electronic device may implement a photographing function through the ISP, the camera 193, the video codec, the GPU, the display 194, the application processor, and the like.

The ISP is configured to process data fed back by the camera 193. The camera 193 is configured to capture a static image or a video. An optical image of an object is generated through a lens, and is projected onto a photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device may include one or N cameras 193, where N is a positive integer greater than 1.

The external memory interface 120 may be configured to connect to an external memory card, for example, a micro SD card, to extend a storage capability of the electronic device. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121 to execute various function applications of the electronic device and data processing. For example, in this embodiment, the processor 110 may run the instructions stored in the internal memory 121, so that the electronic device may send corresponding HTTP requests to different CDN servers based on byte ranges that have an overlapping range and that are allocated to the different CDN servers. Therefore, the electronic device may download same data from the different CDN servers, determines, by using this part of same data, whether the data downloaded from the different CDN servers is consistent, and when determining that the data downloaded from the different CDN servers is consistent, splices data to obtain finally required data. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device is used, and the like. In addition, the internal memory 121 may include a high-speed random access memory, or may include a non-volatile memory such as at least one magnetic disk storage device, a flash storage device, or a universal flash storage (UFS).

The electronic device may implement an audio function, for example, music playing and recording, through the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "horn", is configured to convert an electrical audio signal into a sound signal. The electronic device may listen to music or answer a hands-free call through the speaker 170A.

The receiver 170B, also referred to as an "earpiece", is configured to convert an electrical audio signal into a sound signal. When a call is answered or voice information is received by using the electronic device, the receiver 170B may be put close to a human ear to receive a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device. The headset jack 170D is configured to connect to a wired headset.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. When a touch operation is performed on the display 194, the electronic device detects intensity of the touch operation by using the pressure sensor 180A. The electronic device may also calculate a touch position based on a detection signal of the pressure sensor 180A.

The gyro sensor 180B may be configured to determine a motion posture of the electronic device. The gyro sensor 180B may be configured to implement image stabilization during photographing. The gyro sensor 180B may be further used in a navigation scenario and a motion-sensing game scenario. The barometric pressure sensor 180C is configured to measure barometric pressure. In some embodiments, the electronic device calculates an altitude based on a barometric pressure value measured by the barometric pressure sensor 180C, to assist in positioning and navigation. The magnetic sensor 180D includes a Hall sensor. The electronic device may detect opening and closing of a flip leather case by using the magnetic sensor 180D. The acceleration sensor 180E may detect magnitude of accelerations in various directions (usually on three axes) of the electronic device. The distance sensor 180F is configured to measure a distance. For example, in a shooting scenario, the electronic device may measure a distance by using the distance sensor 180F, to implement fast focusing.

The optical proximity sensor 180G may include a light-emitting diode (LED) and an optical detector, for example, a photodiode. The light-emitting diode may be an infrared light-emitting diode. The electronic device emits infrared light through the light-emitting diode. The electronic device detects infrared reflected light from a nearby object by using the photodiode. When sufficient reflected light is detected, it may be determined that there is an object near the electronic device. When insufficient reflected light is detected, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may be further configured to automatically lock and unlock the screen in a smart cover mode or a pocket mode.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device is in a pocket, to avoid an accidental touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display 194. In some other embodiments, the touch sensor 180K may alternatively be disposed on a surface of the electronic device at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal, and the like. The button 190 includes a power button, a volume button, and the like. The button 190 may be a mechanical button, or may be a touch button. The electronic device may receive button input, and generate key signal input related to user setting and function control of the electronic device.

The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, notification, and the like.

The SIM card interface 195 is configured to connect to a SIM card. The SIM card may be inserted in the SIM card interface 195 or removed from the SIM card interface 195, to implement contact with or separation from the electronic device. The electronic device may support one or N SIM card interfaces, where N is a positive integer greater than 1. The electronic device interacts with a network by using the SIM card, to implement functions such as calling and data communication. In some embodiments, an eSIM, namely, an embedded SIM card is used for the electronic device. The eSIM card may be embedded in the electronic device, and cannot be separated from the electronic device.

All methods in the following embodiments may be implemented in the electronic device having the foregoing hardware structure.

In the embodiments, an electronic device may download corresponding data from a plurality of CDN servers by using an MPHTTP technology based on an original HTTP request initiated by an app (for example, a video application) on the electronic device. This provides larger aggregated bandwidth. Specifically, the electronic device may allocate different byte ranges to the plurality of CDN servers based on a byte range carried in the original HTTP request. In the byte ranges allocated to the plurality of CDN servers, there is an overlapping range in byte ranges used to identify continuous data. In addition, an intersection between the byte ranges allocated to all the CDN servers is the same as the byte range carried in the original HTTP request. The electronic device sends corresponding HTTP requests to different CDN servers based on the byte ranges having the overlapping range, to pull same data (the same data is the data in the byte ranges having the overlapping range) from the different CDN servers. In this way, based on the data, the electronic device can check data consistency of the data downloaded from the different CDN servers. In the embodiments, the plurality of CDN servers may be located in a same network, or may be located in different networks.

For ease of description, in the following embodiments, with reference to the architecture shown in FIG. 2, the technical solutions provided in the embodiments of this application are described in detail by using an example in which an electronic device downloads data from two CDN servers by using an MPHTTP technology and the two CDN servers are located in different networks.

Figure 4:
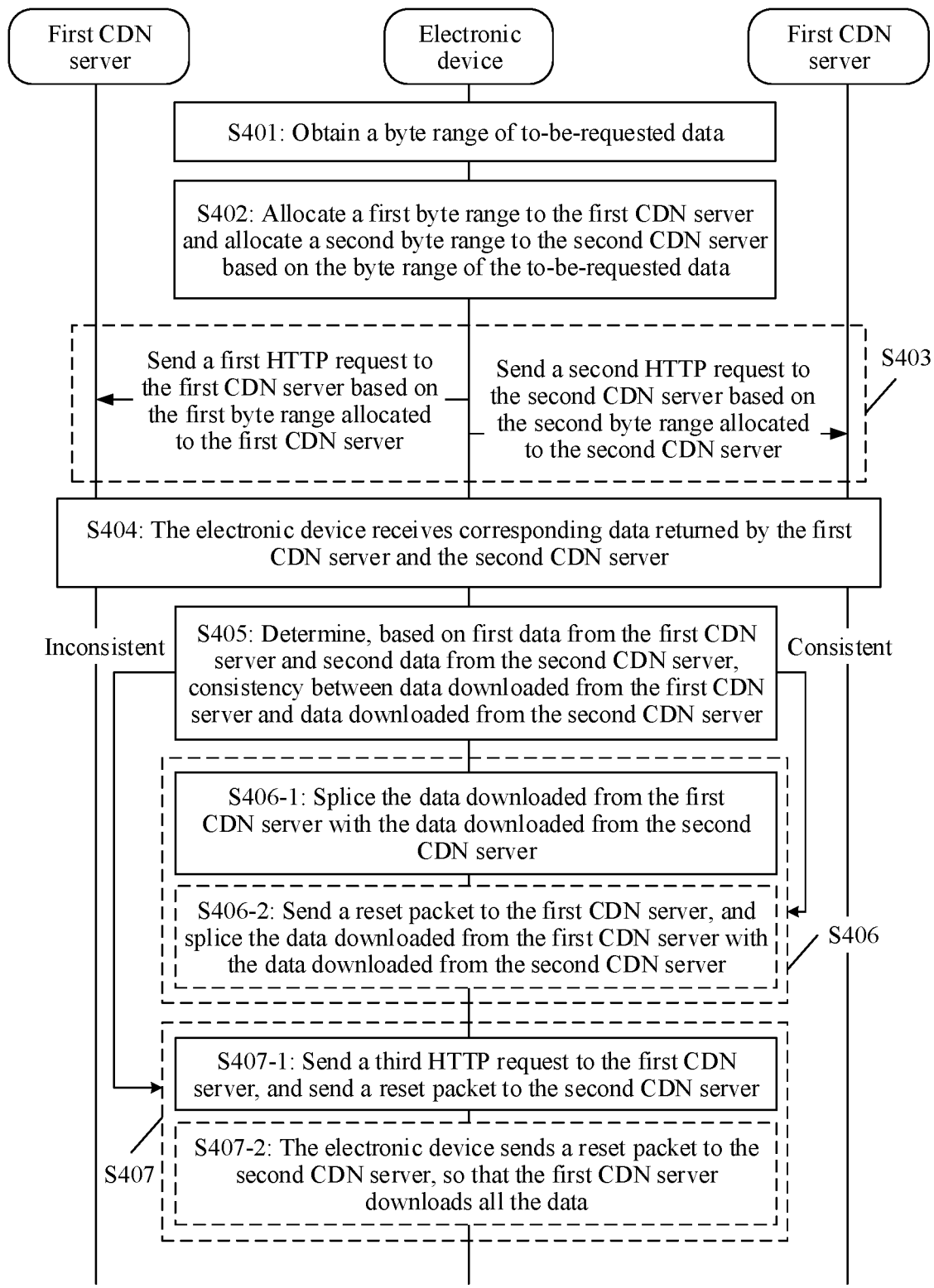
FIG. 4 is a schematic flowchart of an HTTP request transmission method according to an embodiment of this application.

FIG. 4 is a schematic flowchart of an HTTP request transmission method according to an embodiment of this application. As shown in FIG. 4, the method may include the following steps.

S401: An electronic device obtains a byte range of to-be-requested data.

The byte range is used to identify a start byte and an end byte of the requested data.

For example, when a user uses an app on the electronic device, for example, uses a video application on the electronic device to watch a video, the video application needs to obtain corresponding data from a CDN server to play the video for the user. For example, the video application initiates an original HTTP request, to request to obtain the corresponding data. The original HTTP request may carry a resource descriptor and a byte range. The resource descriptor is used to describe to-be-requested data, and the byte range is used to identify a start byte and an end byte of the to-be-requested data. For example, the byte range is [a, d], and is used to identify that the original HTTP request is used to request data from an $a^{th}$ byte to a $d^{th}$ byte of the data described by using the resource descriptor. After the app on the electronic device initiates the original HTTP request, the electronic device may obtain, based on the byte range in the original HTTP request, the byte range of the to-be-requested data, for example, obtain the byte range [a, d] of the to-be-requested data.

S402: The electronic device allocates a first byte range to a first CDN server and allocates a second byte range to a second CDN server based on the byte range of the to-be-requested data.

There is an overlapping range between the first byte range and the second byte range.

For example, with reference to FIG. 2, the first CDN server may be the CDN server 202-1 in the architecture shown in FIG. 2, and the second CDN server may be the CDN server 202-2 in the architecture shown in FIG. 2. To provide larger aggregated bandwidth, the electronic device may download data whose byte range is [a, d] from both the CDN server 202-1 and the CDN server 202-2 by using an MPHTTP technology. In this embodiment, the electronic device may allocate the first byte range to the CDN server 202-1 and allocate the second byte range to the CDN server 202-2 based on the byte range [a, d] of the to-be-requested data. There is the overlapping range between the first byte range and the second byte range. For example, the first byte range allocated by the electronic device to the CDN server 202-1 is [a, b]. The second byte range allocated by the electronic device to the CDN server 202-2 is [c, d]. Both [a, b] and [c, d] are subsets of [a, d]. Bytes with smaller numbers in the second byte range partially overlap bytes with larger numbers in the first byte range. In other words, an end byte of requested data identified by the first byte range is greater than a start byte of requested data identified by the second byte range, that is, c is less than b, and the overlapping range between the first byte range and the second byte range is [c, b].

In some embodiments, S402 may be specifically: after obtaining the byte range of the to-be-requested data, the electronic device may first allocate corresponding byte ranges to a CDN server 202-1 and a CDN server 202-2. For example, the electronic device may first allocate a first byte range' (the first byte range' is the third byte range in this application) to the CDN server 202-1, and allocate a second byte range' (the second byte range' is the fourth byte range in this application) to the CDN server 202-2, to meet a specific performance requirement, for example, a requirement that a rate of downloading data from the different CDN servers is optimal, and for another example, a requirement that performance of the different CDN servers can be balanced. Generally, if these specific performance requirements need to be met, there is no overlapping range between the byte ranges allocated to the CDN server 202-1 and the CDN server 202-2, that is, between the first byte range' and the second byte range'. Then, the electronic device may adjust one or both of the first byte range' and the second byte range', so that there is an overlapping range between the byte ranges (that is, the first byte range and the second byte range) finally allocated to the CDN server 202-1 and the CDN server 202-2. For example, an initial value may be predefined. The electronic device may adjust the one or both of the first byte range' and the second byte range' based on the initial value, to obtain the first byte range and the second byte range having the overlapping range.

That the byte range of the to-be-requested data is [a, d] is still used as an example. The electronic device may first allocate the first byte range' [a, c−1] to the CDN server 202-1, and allocate the second byte range' [c, d] to the CDN server 202-1. Such an allocation result meets the specific performance requirement, for example, obtaining the optimal rate of downloading the data from both the CDN server 202-1 and the CDN server 202-2. Then, the electronic device adjusts the first byte range' based on the initial value (for example, the initial value is e), to adjust the first byte range' to [a, c−1+e]. It may be understood that c−1+e=b. The second byte range' may remain unchanged. In this way, a first byte range finally allocated by the electronic device to the CDN server 202-1 is [a, c−1+e], namely, [a, b], and a second byte range finally allocated by the electronic device to the CDN server 202-2 is [c, d]. Therefore, the overlapping range between the first byte range and the second byte range is [c, b], namely, [c, c−1+e]. For example, the byte range of the to-be-requested data is [1, 200], that is, a=1 and d=200. The electronic device may first allocate the first byte range' [1, 100] to the CDN server 202-1, and allocate the second byte range' [101, 200] to the CDN server 202-1, that is, c=101. Then, the electronic device adjusts the first byte range' based on the initial value e=10, to adjust the first byte range' to [1, 110], that is, b=110. The second byte range' may remain unchanged. It may be understood that the first byte range finally allocated by the electronic device to the CDN server 202-1 is [1, 110], and the second byte range allocated by the electronic device to the CDN server 202-2 is [101, 200]. There is the overlapping range [101, 110] between the first byte range and the second byte range.

S403: The electronic device sends a first HTTP request to the first CDN server based on the first byte range allocated to the first CDN server, and sends a second HTTP request to the second CDN server based on the second byte range allocated to the second CDN server.

After the electronic device allocates the corresponding byte ranges to the first CDN server and the second CDN server, the electronic device may generate corresponding HTTP requests, for example, the first HTTP request and the second HTTP request, to request corresponding data from corresponding CDN servers. In other words, the electronic device may send the generated HTTP requests to the corresponding CDN servers through networks, to request the corresponding data. For example, with reference to the architecture shown in FIG. 2, the electronic device may send the first HTTP request to the CDN server 202-1 through the first network such as the cellular network, and send the second HTTP request to the CDN server 202-2 through the second network such as the Wi-Fi network.

In this embodiment of this application, the electronic device may send different HTTP requests to the CDN servers, to request the CDN servers to return the corresponding data. With reference to examples in S401 and S402, the following describes in detail S403 based on the different HTTP requests sent by the electronic device.

Manner 1: The electronic device adds, to the first HTTP request, the first byte range [a, b] allocated to the CDN server 202-1 in S402, to send to the CDN server 202-1, and adds, to the second HTTP request, the second byte range [c, d] allocated to the CDN server 202-2 in S402, to send to the CDN server 202-2. In addition, the first HTTP request and the second HTTP request may further carry the resource descriptor used to describe the to-be-requested data. The resource descriptor may be obtained by the electronic device based on the original HTTP request initiated by the app. For example, with reference to the example in S403, the electronic device may send the first HTTP request to the CDN server 202-1, and the first HTTP request carries the resource descriptor and the byte range [1, 110]. The electronic device sends the second HTTP request to the CDN server 202-2, and the second HTTP request carries the resource descriptor and the byte range [101, 200].

Manner 2: The electronic device adds, to the first HTTP request, the byte range [a, d], of the to-be-requested data, obtained in S401, to send to the CDN server 202-1, and adds, to the second HTTP request, the second byte range [c, d] allocated to the CDN server 202-2 in S402, to send to the CDN server 202-2. In addition, the first HTTP request and the second HTTP request may further carry the resource descriptor used to describe the to-be-requested data. The resource descriptor may be obtained by the electronic device based on the original HTTP request initiated by the app. For example, with reference to the example in S403, the electronic device may send the first HTTP request to the CDN server 202-1, and the first HTTP request carries the resource descriptor and the byte range [1, 200]. The electronic device sends the second HTTP request to the CDN server 202-2, and the second HTTP request carries the resource descriptor and the byte range [101, 200].

Manner 3: The electronic device sends the first HTTP request to the CDN server 202-1, and the first HTTP request includes the resource descriptor used to describe the to-be-requested data, and does not include a byte range field (or in other words, the byte range field is empty). The electronic device adds, to the second HTTP request, the second byte range [c, d] allocated to the CDN server 202-2 in S402, to send to the CDN server 202-2. The second HTTP request may further include the resource descriptor used to describe the to-be-requested data. For example, with reference to the example in S403, the electronic device may send the first HTTP request to the CDN server 202-1, and the first HTTP request carries the resource descriptor and does not carry the byte range field. The electronic device sends the second HTTP request to the CDN server 202-2, and the second HTTP request carries the resource descriptor and the byte range [101, 200].

S404: The electronic device receives corresponding data returned by the first CDN server and the second CDN server.

S405: The electronic device determines, based on first data from the first CDN server and second data from the second CDN server, consistency between data downloaded from the first CDN server and data downloaded from the second CDN server.

The first data and the second data each are the data whose byte range is the overlapping range. For example, with reference to the example in S403, the first data and the second data are the data whose byte range is [c, b].

After the electronic device sends the corresponding HTTP requests to the first CDN server and the second CDN server, the first CDN server and the second CDN server may separately return the corresponding data to the electronic device based on the received HTTP requests. In other words, the electronic device may download the corresponding data from the first CDN server and the second CDN server. According to the description in S403, it may be understood that the electronic device requests, based on the first HTTP request and the second HTTP request, the data whose byte range is [c, b] from the corresponding CDN servers. In other words, the electronic device downloads, from the first CDN server, the data whose byte range is [c, b], for example, referred to as the first data, and downloads, from the second CDN server, the data whose byte range is [c, b], for example, referred to as the second data. After receiving the first data and the second data, the electronic device may check, based on the first data and the second data, whether the data downloaded from the first CDN server is consistent with the data downloaded from the second CDN server. For example, the data consistency check is performed on the first data and the second data in a binary comparison manner, when binary comparison between the first data and the second data is totally consistent, it may be determined that the check succeeds; otherwise, it may be determined that the check fails.

For example, after the electronic device sends the first HTTP request to the CDN server 202-1 and sends the second HTTP request to the CDN server 202-2 in any manner described in Manner 1, Manner 2, and Manner 3 in S403, the electronic device may receive the data returned by the CDN server 202-1 and the CDN server 202-2. When the electronic device receives data that is returned by the CDN server 202-1 and whose byte range is [a, b], the electronic device may determine whether data that is returned by the CDN server 202-2 and whose byte range is [c, b] is received. In other words, when completing downloading of the data whose byte range is [a, b] from the CDN server 202-1, the electronic device may determine whether downloading of the data whose byte range is [c, b] from the CDN server 202-2 is completed.

If the electronic device completes the downloading of the data whose byte range is [c, b] from the CDN server 202-2 when completing the downloading of the data whose byte range is [a, b] from the CDN server 202-1, the electronic device may check consistency between the data that is downloaded from the CDN server 202-1 and whose byte range is [c, b], and the data that is downloaded from the CDN server 202-2 and whose byte range is [c, b].

If the electronic device does not complete the downloading of the data whose byte range is [c, b] from the CDN server 202-2 when completing the downloading of the data whose byte range is [a, b] from the CDN server 202-1, in some embodiments, the electronic device may stop downloading data from the CDN server 202-2, and download remaining data from the CDN server 202-1, for example, data whose byte range is [b+1, d]. In some other embodiments, the electronic device may wait for preset time, so that at least data whose byte range is [c, b] is downloaded from the CDN server 202-2. If the electronic device completes the downloading of the data whose byte range is [c, b] from the CDN server 202-2 after the preset time, the electronic device may check consistency between the data that is downloaded from the CDN server 202-1 and whose byte range is [c, b], and the data that is downloaded from the CDN server 202-2 and whose byte range is [c, b]. If the electronic device still does not complete the downloading of the data whose byte range is [c, b] from the CDN server 202-2 after the preset time, the electronic device may stop downloading data from the CDN server 202-2, and download remaining data from the CDN server 202-1, for example, data whose byte range is [b+1, d].

It may be understood that, in Manner 2 and Manner 3 in S403, the first HTTP request sent by the electronic device to the CDN server 202-1 may be used to request to download the data whose byte range is [b+1, d]. Therefore, in the two implementations, if the electronic device stops downloading the data from the CDN server 202-2, and downloads the remaining data from the CDN server 202-1, there is no need to intervene in a process of downloading the data from the CDN server 202-1. The electronic device automatically downloads the remaining data from the CDN server 202-1, provided that the electronic device sends a corresponding reset packet to the CDN server 202-2 to request to stop returning the data from the CDN server 202-2. However, in Manner 1 in S403, the first HTTP request sent by the electronic device to the CDN server 202-1 is only used to request to download the data whose byte range is [a, b]. Therefore, in this implementation, if the electronic device stops downloading the data from the CDN server 202-2, and downloads the remaining data from the CDN server 202-1, the electronic device needs to send a corresponding reset packet to the CDN server 202-2 to request to stop returning the data from the CDN server 202-2, and also needs to send, to the CDN server 202-1, an HTTP request that carries the byte range [b+1, d], so that the electronic device can download the remaining data from the CDN server 202-1.

For example, with reference to the example in S403, after the electronic device sends the first HTTP request to the CDN server 202-1, and sends the second HTTP request to the CDN server 202-2, the electronic device may receive the data returned by the CDN server 202-1 and the CDN server 202-2. When completing downloading of the data whose byte range is [1, 110] from the CDN server 202-1, the electronic device may determine whether downloading of the data whose byte range is [101, 110] from the CDN server 202-2 is completed. If the electronic device completes the downloading of the data whose byte range is [101, 110] from the CDN server 202-2 when completing the downloading of the data whose byte range is [1, 110] from the CDN server 202-1, the electronic device may check consistency between the data that is downloaded from the CDN server 202-1 and whose byte range is [101, 110], and the data that is downloaded from the CDN server 202-2 and whose byte range is [101, 110].

If the electronic device does not complete the downloading of the data whose byte range is [101, 110] from the CDN server 202-2 when completing the downloading of the data whose byte range is [1, 110] from the CDN server 202-1, the electronic device may wait for the preset time, so that at least the data whose byte range is [101, 110] is downloaded from the CDN server 202-2. If the electronic device completes the downloading of the data whose byte range is [101, 110] from the CDN server 202-2 after the preset time, the electronic device may check data consistency between the data that is downloaded from the CDN server 202-1 and whose byte range is [101, 110], and the data that is downloaded from the CDN server 202-2 and whose byte range is [101, 110]. If the electronic device still does not complete the downloading of the data whose byte range is [101, 110] from the CDN server 202-2 after the preset time, the electronic device may stop downloading data from the CDN server 202-2, and download data whose byte range is [111, 200] from the CDN server 202-1. For example, in Manner 2 and Manner 3 in S403, the electronic device automatically downloads the data whose byte range is [111, 200] from the CDN server 202-1. The electronic device also needs to send the corresponding reset packet to the CDN server 202-2 to request to stop returning the data from the CDN server 202-2. For another example, in Manner 1 in S403, the electronic device needs to send the corresponding reset packet to the CDN server 202-2 to request to stop returning the data from the CDN server 202-2, and also needs to send, to the CDN server 202-1, the HTTP request that carries the byte range [111, 200], so that the electronic device downloads the remaining data from the CDN server 202-1.

In some other embodiments of this application, it may be understood that the data returned by the CDN servers to the electronic device is not necessarily all valid data. For example, the returned data may not indicate content, but data such as padding data (for example, \0), or control data. Therefore, to ensure accuracy of the data consistency check, after obtaining the first data and the second data, the electronic device may first obtain a proportion of valid data in the first data and the second data. If the proportion of the valid data is greater than a threshold 1, it indicates that the accuracy of the data consistency check performed based on the first data and the second data is relatively high. In this case, the electronic device may check, based on the first data and the second data, consistency between the data downloaded from the first CDN server and the data downloaded from the second CDN server, that is, performs the operation of determining the consistency of the data downloaded from the first CDN server and the data downloaded from the second CDN server in S405. If the proportion of the valid data is less than the threshold 1, it indicates that the accuracy of the data consistency check performed based on the first data and the second data is not high. In this case, the electronic device may increase a size of the overlapping range, and then re-determine whether a proportion of valid data in data (for example, the third data and the fourth data in this application) corresponding to an overlapping range obtained after the size is increased is greater than the threshold 1. If the proportion of the valid data is greater than the threshold 1, the electronic device may check, based on the data corresponding to the overlapping range obtained after the size is increased, consistency between the data downloaded from the first CDN server and the data downloaded from the second CDN server. If the proportion of the valid data is not greater than the threshold 1, a size of the overlapping range may be further increased until whether a proportion of valid data in data corresponding to a finally obtained overlapping range is greater than the threshold 1.

For example, the data whose byte range is [101, 110] and that is downloaded by the electronic device from the CDN server 202-1 is data 1, and the data whose byte range is [101, 110] and that is downloaded from the CDN server 202-2 is data 2. The electronic device may obtain a proportion of valid data in the data 1 and the data 2. If the proportion of the valid data is greater than the threshold 1, the electronic device may check, based on the data 1 and the data 2, consistency of the data downloaded from the first CDN server and the data downloaded from the second CDN server. If the proportion of the valid data is less than the threshold 1, the electronic device may increase a size of the overlapping range. For example, the electronic device continues to download data whose byte range is [111, 120] from the CDN server 202-1, and continues to download data whose byte range is [111, 120] from the CDN server 202-2. In this case, the overlapping range of the byte ranges is [101, 120]. Then, the electronic device may re-determine whether a proportion of valid data in data that is downloaded from the CDN server 202-1 and the CDN server 202-2 and whose byte range is [101, 120] is greater than the threshold 1. If the proportion is greater than the threshold 1, the electronic device may check, based on the data that is downloaded from the CDN server 202-1 and the CDN server 202-2 and whose byte range is [101, 120], consistency between the data downloaded from the first CDN server and the data downloaded from the second CDN server. If the proportion of the valid data is not greater than the threshold 1, a size of the overlapping range may be further increased, for example, the overlapping range of the byte ranges is increased to [101, 130], until whether a proportion of valid data in data corresponding to a finally obtained overlapping range is greater than the threshold 1. In some other embodiments, the electronic device may alternatively determine, based on only a proportion of valid data in data that continues to be downloaded after the overlapping range is increased, the accuracy of the data consistency check performed based on this part of data, and when determining that the accuracy is relatively high, check data consistency based on this part of data. For example, after the electronic device continues to download the data whose byte range is [111, 120] from the CDN server 202-1, and downloads the data whose byte range is [111, 120] from the CDN server 202-2, the electronic device may obtain only a proportion of valid data in the data whose byte range is [111, 120] and that is downloaded from the CDN server 202-1 and the CDN server 202-2. In addition, when determining that the proportion of the valid data is greater than the threshold 1, the electronic device checks consistency between the data downloaded from the first CDN server and the data downloaded from the second CDN server based on the data that is downloaded from the CDN server 202-1 and the CDN server 202-2 and whose byte range is [111, 120].

The foregoing is described by using an example in which the accuracy of the data consistency check performed based on the data is determined based on the proportion of the valid data in the data downloaded from the different CDN servers. In some other embodiments, after obtaining the first data and the second data, the electronic device may first obtain a proportion of the padding data (for example, \0) in the first data and the second data and/or a proportion of the control data in the first data and the second data. If the proportion of the data is less than a threshold 2, it indicates that accuracy of data consistency check performed based on the first data and the second data is relatively high. In this case, the electronic device may check, based on the first data and the second data, consistency between the data downloaded from the first CDN server and the data downloaded from the second CDN server. If the proportion of the data is greater than the threshold 2, it indicates that the accuracy of the data consistency check performed based on the first data and the second data is not high. In this case, the electronic device may increase a size of the overlapping range. Then, a subsequent operation continues to be performed based on data corresponding to an overlapping range obtained after the size is increased (a detailed description of the subsequent operation is the same as the description in the foregoing example, and details are not described herein again).

In this embodiment of this application, if the electronic device determines that the data downloaded from the first CDN server is consistent with the data downloaded from the second CDN server, S406 may be performed. If the electronic device determines that the data downloaded from the first CDN server is inconsistent with the data downloaded from the second CDN server, S407 may be performed.

S406 and S407 are also different for different HTTP requests sent in S403. Specifically, in Manner 1 in S403, S406 may be specifically the following S406-1, and S407 may be specifically the following S407-1. In other words, if the electronic device determines that the data downloaded from the first CDN server is consistent with the data downloaded from the second CDN server, S406-1 may be performed. If the electronic device determines that the data downloaded from the first CDN server is inconsistent with the data downloaded from the second CDN server, S407-1 may be performed.

S406-1: The electronic device splices the data downloaded from the first CDN server and the data downloaded from the second CDN server.

When it is determined that the data downloaded from the first CDN server is consistent with the data downloaded from the second CDN server, it indicates that the data downloaded from the first CDN server may be spliced with the data downloaded from the second CDN server for use. The second CDN server may continue to return data to the electronic device, that is, the electronic device may continue to receive the data from the second CDN server. With reference to the foregoing example, the electronic device may download data whose byte range is [a, b] (for example, [1, 110]) from the CDN server 202-1, and download data whose byte range is [c, d], for example, [101, 200] from the CDN server 202-2. The electronic device splices the data downloaded from the CDN server 202-1 and the data downloaded from the CDN server 202-2, to obtain the data whose byte range is [a, d], requested by the original HTTP request.

S407-1: The electronic device sends a third HTTP request to the first CDN server, and sends a reset packet to the second CDN server.

The third HTTP request is used to request to download the data identified by the first byte range in the to-be-requested data in S401.

When it is determined that the data downloaded from the first CDN server is inconsistent with the data downloaded from the second CDN server, it indicates that data obtained through splicing may be invalid when the data downloaded from the first CDN server is spliced with the data downloaded from the second CDN server. Therefore, the electronic device may discard the data that is downloaded from the second CDN server, and send the reset packet to the second CDN server, so that the second CDN server stops returning the data to the electronic device. In addition, in Manner 1 in S403, the first HTTP request sent by the electronic device to the CDN server 202-1 is only used to request the data whose byte range is [a, b] (for example, [1, 110]). Therefore, the electronic device may send the third HTTP request to the CDN server 202-1. A byte range carried in the third HTTP request is [b+1, d] (for example, [111, 200]), so that the electronic device can continue to download the remaining data from the CDN server 202-1. That is, the electronic device may download the data whose byte range is [a, d] (for example, [1, 200]) from the CDN server 202-1.

It may be understood that, as described in S405, the data returned by the CDN servers to the electronic device is not necessarily all valid data, that is, the data consistency check may not be performed based on the first data and the second data. If the data consistency check cannot be performed based on the first data and the second data, the electronic device may re-obtain corresponding data by increasing the size of the overlapping area, to check data consistency. In this embodiment, if the HTTP request is transmitted in Manner 1 in S403, when determining that the data consistency check cannot be performed based on the first data and the second data, the electronic device may send the third HTTP request to the first CDN server, to continue to download the data from the first CDN server. In this way, after the data consistency check is performed, the following steps described in S406-2 or S407-2 may be performed based on a check result.

In Manner 2 and Manner 3 in S403, S406 may be specifically the following S406-2, and S407 may be specifically the following S407-2. In other words, if the electronic device determines that the data downloaded from the first CDN server is consistent with the data downloaded from the second CDN server, S406-2 may be performed. If the electronic device determines that the data downloaded from the first CDN server is inconsistent with the data downloaded from the second CDN server, S407-2 may be performed.

S406-2: The electronic device sends a reset packet to the first CDN server, and splices the data downloaded from the first CDN server and the data downloaded from the second CDN server.

When it is determined that the data downloaded from the first CDN server is consistent with the data downloaded from the second CDN server, it indicates that the data downloaded from the first CDN server may be spliced with the data downloaded from the second CDN server for use. However, in Manner 2 and Manner 3 in S403, the first HTTP request sent by the electronic device to the first CDN server is used to request all the data. Therefore, the electronic device may send the reset packet to the first CDN server, so that the first CDN server stops returning data to the electronic device, and the second CDN server continues to return the data to the electronic device. In this way, with reference to the foregoing example, the electronic device may download the data whose byte range is [a, b] (for example, [1, 110]) from the CDN server 202-1, and download the data whose byte range is [c, d], for example, [101, 200] from the CDN server 202-2. The electronic device splices the data downloaded from the CDN server 202-1 and the data downloaded from the CDN server 202-2, to obtain the data whose byte range is [a, d], requested by the original HTTP request.

S407-2: The electronic device sends a reset packet to the second CDN server, so that the first CDN server downloads all the data.

When it is determined that the data downloaded from the first CDN server is inconsistent with the data downloaded from the second CDN server, it indicates that data obtained through splicing may be invalid when the data downloaded from the first CDN server is spliced with the data downloaded from the second CDN server. Therefore, the electronic device may discard the data that is downloaded from the second CDN server, and send the reset packet to the second CDN server, so that the second CDN server stops returning the data to the electronic device. In addition, as described in S406-2, in Manner 2 and Manner 3 in S403, the first HTTP request sent by the electronic device to the first CDN server is used to request all the data. Therefore, there is no need to intervene in the process of downloading the data from the first CDN server, the electronic device automatically downloads the remaining data from the first CDN server. With reference to the foregoing example, the electronic device may download the data whose byte range is [a, d] (for example, [1, 200]) from the CDN server 202-1.

In this embodiment of this application, in an HTTP2, the reset packet may be an HTTP reset packet. In an HTTP1/1.1, the reset packet may be a TCP reset packet, and is used to indicate the CDN server to stop returning data to the electronic device.

It should be noted that, in the foregoing embodiment, an example in which the electronic device downloads the data from the two CDN servers by using the MPHTTP technology is used to describe the technical solutions provided in the embodiments of this application. Certainly, the technical solutions in this embodiment may be further applied to scenarios in which an electronic device downloads data from three or more CDN servers by using an MPHTTP technology. In these scenarios, the electronic device may use the method in the foregoing embodiment to check consistency of data from the CDN servers configured to return continuous data to the electronic device. For example, the electronic device downloads the data from three CDN servers, which are a CDN server 1, a CDN server 2, and a CDN server 3, by using the MPHTTP technology. A byte range of data requested by using an original HTTP request is [a, f]. The electronic device may allocate a byte range 1 to the CDN server 1. For example, the byte range 1 is [a, b]. The electronic device may allocate a byte range 2 to the CDN server 2. For example, the byte range 2 is [c, d]. The electronic device may allocate a byte range 3 to the CDN server 3. For example, the byte range 3 is [e, f]. All [a, b], [c, d], and [e, f] are subsets of [a, f]. In other words, the electronic device needs to download at least data in the byte range 1 from the CDN server 1, download data in the byte range 2 from the CDN server 2, and download data in the byte range 3 from the CDN server 3. For example, the data identified by the byte range 1 and the data identified by the byte range 2 are continuous, and the data identified by the byte range 2 and the data identified by the byte range 3 are continuous. In this embodiment, the electronic device may check consistency between the data from the CDN server 1 and the data from the CDN server 2, and check consistency between the data from the CDN server 2 and the data from the CDN server 3.

For example, there is an overlapping range between the byte range 1 [a, b] and the byte range 2 [c, d]. For example, c is less than b, that is, there is the overlapping range [c, b] between the byte range 1 and the byte range 2. There is an overlapping range between the byte range 2 [c, d] and the byte range 3 [e, f]. For example, e is less than d, that is, there is the overlapping range [e, d] between the byte range 2 and the byte range 3. In this way, the electronic device may download same data from the CDN server 1 and the CDN server 2 by using the byte range 1 and the byte range 2, that is, data whose byte range is [c, b]. The electronic device may check consistency between the data downloaded from the CDN server 1 and the data downloaded from the CDN server 2 based on the byte range [c, b] downloaded from the CDN server 1 and the byte range [c, b] downloaded from the CDN server 2. If the check succeeds, the electronic device may splice the data downloaded from the CDN server 1 and the data downloaded from the CDN server 2 for use. If the check fails, splicing cannot be performed. Likewise, the electronic device may download same data from the CDN server 2 and the CDN server 3 by using the byte range 2 and the byte range 3, that is, data whose byte range is [e, d]. The electronic device may check consistency between the data downloaded from the CDN server 2 and the data downloaded from the CDN server 3 based on the byte range [e, d] downloaded from the CDN server 2 and the byte range [e, d] downloaded from the CDN server 3. If the check succeeds, the electronic device may splice the data downloaded from the CDN server 2 and the data downloaded from the CDN server 3 for use. If the check fails, splicing cannot be performed. A specific processing process is similar to corresponding content in the foregoing embodiment, and details are not described herein again.

According to the foregoing technical solution, when the electronic device needs to download the data from the plurality of CDN servers, the overlapping range may be designed for the byte ranges allocated to the different CDN servers. This means that the electronic device downloads the data in the overlapping range from all the different CDN servers, and this part of data is used to check consistency of the data pulled from the different CDN servers. When determining that the data pulled from the different CDN servers is consistent, the electronic device may splice the data to obtain the finally required data. In this way, the MPHTTP technology is used to obtain larger aggregated bandwidth, and ensure data splicing validity and normal service running. In addition, before the data consistency check is performed, the proportion of valid data or padding data in the to-be-compared data is first determined. Only when the proportion meets a specific condition, data consistency check is performed, to ensure accuracy of the data consistency check. In addition, the technical solution does not need to be improved on a CDN server side, and can be implemented only by performing optimization on a device side. Therefore, deployment difficulty is low, and an application scope is wide. In addition, this embodiment is applied to an HTTP1/1.1 scenario, and applied to an HTTP2 scenario.

Another embodiment of this application further provides an electronic device. The electronic device may include a processor, a memory, and a communications interface. The memory and the communications interface are coupled to the processor. The communications interface is configured to communicate with another device. The another device includes a first CDN server and a second CDN server. The memory is configured to store computer program code. The computer program code includes computer instructions. When the computer instructions are executed by the electronic device, the electronic device is enabled to perform the steps performed by the electronic device in the embodiment shown in FIG. 4.

Another embodiment of this application further provides a computer-readable storage medium, including computer software instructions. When the computer software instructions are run on an electronic device, the electronic device is enabled to perform the steps performed by the electronic device in the embodiment shown in FIG. 4.

Another embodiment of this application further provides a computer program product. When the computer program product runs on a computer, the computer is enabled to perform the steps performed by the electronic device in the embodiment shown in FIG. 4.

Another embodiment of this application further provides an apparatus. The apparatus has a function of implementing behavior of the electronic device in the embodiment corresponding to FIG. 4. The function may be implemented by hardware, or may be implemented by hardware by executing corresponding software. The hardware or software includes one or more modules corresponding to the foregoing function, for example, an allocation unit or module, a sending unit or module, a receiving unit or module, and an obtaining unit or module.

The foregoing descriptions about implementations allow a person skilled in the art to understand that, for the purpose of convenient and brief description, division into the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the division into the modules or units is merely logical function division and may be other division in actual implementation. For example, a plurality of units or components may be spliced or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A hypertext transfer protocol (HTTP) request transmission method, the method comprising:
    allocating, by an electronic device based on a byte range of to-be-requested data, a first byte range to a first content distribution network (CDN) server and a second byte range to a second CDN server, wherein there is an overlapping range between the first byte range and the second byte range, wherein the allocating the first byte range to the first CDN server and the second byte range to the second CDN server comprises:
        allocating, by the electronic device based on the byte range of the to-be-requested data, a third byte range to the first CDN server and a fourth byte range to the second CDN server, wherein there is no overlapping range between the third byte range and the fourth byte range; and
        adjusting, by the electronic device based on a predefined initial value, an end byte of requested data identified by the third byte range, to obtain the first byte range, and using the fourth byte range as the second byte range;
    sending, by the electronic device, a first HTTP request to the first CDN server based on the first byte range; and
    sending, by the electronic device, a second HTTP request to the second CDN server based on the second byte range,
    wherein the first HTTP request is at least used to download first data from the first CDN server, the second HTTP request is at least used to download second data from the second CDN server, and the first data and the second data each are data whose byte range is the overlapping range and are used to check consistency between data downloaded from the first CDN server and data downloaded from the second CDN server.

2. The method according to claim 1, wherein an end byte of requested data identified by the first byte range is greater than a start byte of requested data identified by the second byte range.

3. The method according to claim 1, wherein the method further comprises:
receiving, by the electronic device, the first data from the first CDN server;
receiving, by the electronic device, the second data from the second CDN server; and
checking, by the electronic device based on the first data and the second data, the consistency between the data downloaded from the first CDN server and the data downloaded from the second CDN server.

4. The method according to claim 3, wherein before the checking, by the electronic device based on the first data and the second data, the consistency between the data downloaded from the first CDN server and the data downloaded from the second CDN server, the method further comprises:
obtaining, by the electronic device, a proportion of padding data in the first data and the second data; and
wherein the checking, by the electronic device based on the first data and the second data, the consistency between the data downloaded from the first CDN server and the data downloaded from the second CDN server comprises:
in response to determining that the proportion of the padding data is less than a threshold, checking, by the electronic device based on the first data and the second data, the consistency between the data downloaded from the first CDN server and the data downloaded from the second CDN server.

5. The method according to claim 4, wherein the method further comprises:
in response to determining that the proportion of the padding data is greater than the threshold, adjusting, by the electronic device, the end byte of the requested data identified by the first byte range, and increasing the overlapping range between the first byte range and the second byte range, at least to download third data from the first CDN server and download fourth data from the second CDN server;
in response to determining that a proportion of padding data in the third data and the fourth data is less than the threshold, checking, by the electronic device based on the third data and the fourth data, the consistency between the data downloaded from the first CDN server and the data downloaded from the second CDN server; and
in response to determining that the proportion of the padding data in the third data and the fourth data is greater than the threshold, continuing to increase, by the electronic device, the overlapping range between the first byte range and the second byte range, and checking, until a proportion of padding data in data that is downloaded from the first CDN server and downloaded from the second CDN server and that has a same byte range is less than the threshold, the consistency between the data downloaded from the first CDN server and the data downloaded from the second CDN server.

6. The method according to claim 1,
wherein:
the first HTTP request comprises a resource descriptor and the first byte range;

the first HTTP request comprises the resource descriptor and the byte range of the to-be-requested data; or
the first HTTP request comprises the resource descriptor; and
wherein the second HTTP request comprises the resource descriptor and the second byte range, wherein the resource descriptor is used to describe the to-be-requested data.

7. The method according to claim 6, wherein the first HTTP request comprises the resource descriptor and the byte range of the to-be-requested data, or the first HTTP request comprises the resource descriptor, and the method further comprises:
in response to the electronic device determining that the data downloaded from the first CDN server is consistent with the data downloaded from the second CDN server, sending, by the electronic device, a reset packet to the first CDN server, and splicing the data downloaded from the first CDN server and the data downloaded from the second CDN server, to obtain the to-be-requested data; and
in response to the electronic device determining that the data downloaded from the first CDN server is inconsistent with the data downloaded from the second CDN server, sending, by the electronic device, the reset packet to the second CDN server, and downloading the to-be-requested data from the first CDN server,
wherein the reset packet is used to indicate to stop returning data to the electronic device.

8. The method according to claim 6, wherein the first HTTP request comprises the resource descriptor and the first byte range, and the method further comprises:
in response to the electronic device determining that the data downloaded from the first CDN server is consistent with the data downloaded from the second CDN server, splicing, by the electronic device, the data downloaded from the first CDN server and the data downloaded from the second CDN server, to obtain the to-be-requested data; or
in response to the electronic device determining that the data downloaded from the first CDN server is inconsistent with the data downloaded from the second CDN server, sending, by the electronic device, a third HTTP request to the first CDN server, and sending a reset packet to the second CDN server, wherein the third HTTP request is used to request to download data that is in the to-be-requested data and that is not identified by the first byte range, and the reset packet is used to indicate to stop returning data to the electronic device.

9. The method according to claim 1,
wherein the sending the first HTTP request to the first CDN server comprises: sending, by the electronic device, the first HTTP request to the first CDN server through a first network; and
wherein the sending a second HTTP request to the second CDN server comprises: sending, by the electronic device, the second HTTP request to the second CDN server through a second network,
wherein the first network is different from the second network.

10. The method according to claim 9, wherein the first network is a cellular network, and the second network is a wireless fidelity (Wi-Fi) network.

11. An electronic device, comprising:
at least one processor; and
a memory coupled to the at least one processor and configured to store programming instructions that, when executed by the at least one processor, cause the electronic device to perform operations comprising:
allocating, based on a byte range of to-be-requested data, a first byte range to a first content distribution network (CDN) server and allocating a second byte range to a second CDN server, wherein there is an overlapping range between the first byte range and the second byte range, wherein the allocating the first byte range to the first CDN server and the second byte range to the second CDN server comprises:
allocating, based on the byte range of the to-be-requested data, a third byte range to the first CDN server and a fourth byte range to the second CDN server, wherein there is no overlapping range between the third byte range and the fourth byte range; and
adjusting, based on a predefined initial value, an end byte of requested data identified by the third byte range, to obtain the first byte range, and using the fourth byte range as the second byte range;
sending a first HTTP request to the first CDN server based on the first byte range; and
sending a second HTTP request to the second CDN server based on the second byte range,
wherein the first HTTP request is at least used to download first data from the first CDN server, the second HTTP request is at least used to download second data from the second CDN server, and the first data and the second data each are data whose byte range is the overlapping range and are used to check consistency between data downloaded from the first CDN server and data downloaded from the second CDN server.

12. The electronic device according to claim 11, wherein an end byte of requested data identified by the first byte range is greater than a start byte of requested data identified by the second byte range.

13. The electronic device according to claim 11, wherein the operations further comprise:
receiving the first data from the first CDN server;
receiving the second data from the second CDN server; and
checking, based on the first data and the second data, the consistency between the data downloaded from the first CDN server and the data downloaded from the second CDN server.

14. The electronic device according to claim 13, wherein before the checking, based on the first data and the second data, the consistency between the data downloaded from the first CDN server and the data downloaded from the second CDN server, the operations further comprise:
obtaining a proportion of padding data in the first data and the second data; and
wherein the checking, based on the first data and the second data, the consistency between the data downloaded from the first CDN server and the data downloaded from the second CDN server comprises:
in response to determining that the proportion of the padding data is less than a threshold, checking, based on the first data and the second data, the consistency between the data downloaded from the first CDN server and the data downloaded from the second CDN server.

15. The electronic device according to claim 14, wherein the operations further comprise:
in response to determining that the proportion of the padding data is greater than the threshold, adjusting the end byte of the requested data identified by the first byte range, and increasing the overlapping range between the first byte range and the second byte range, at least to download third data from the first CDN server and download fourth data from the second CDN server;
in response to determining that a proportion of padding data in the third data and the fourth data is less than the threshold, checking, based on the third data and the fourth data, the consistency between the data downloaded from the first CDN server and the data downloaded from the second CDN server; and
in response to determining that the proportion of the padding data in the third data and the fourth data is greater than the threshold, continuing to increase the overlapping range between the first byte range and the second byte range, and checking, until a proportion of padding data in data that is downloaded from the first CDN server and downloaded from the second CDN server and that has a same byte range is less than the threshold, the consistency between the data downloaded from the first CDN server and the data downloaded from the second CDN server.

16. The electronic device according to claim 11, wherein:
the first HTTP request comprises a resource descriptor and the first byte range;
the first HTTP request comprises the resource descriptor and the byte range of the to-be-requested data; or
the first HTTP request comprises the resource descriptor; and
wherein the second HTTP request comprises the resource descriptor and the second byte range, wherein the resource descriptor is used to describe the to-be-requested data.

17. The electronic device according to claim 16, wherein the first HTTP request comprises the resource descriptor and the byte range of the to-be-requested data, or the first HTTP request comprises the resource descriptor, and the operations further comprise:
in response to the electronic device determining that the data downloaded from the first CDN server is consistent with the data downloaded from the second CDN server, sending a reset packet to the first CDN server, and splicing the data downloaded from the first CDN server and the data downloaded from the second CDN server, to obtain the to-be-requested data; and
in response to the electronic device determining that the data downloaded from the first CDN server is inconsistent with the data downloaded from the second CDN server, sending the reset packet to the second CDN server, and downloading the to-be-requested data from the first CDN server,
wherein the reset packet is used to indicate to stop returning data to the electronic device.

18. The electronic device according to claim 16, wherein the first HTTP request comprises the resource descriptor and the first byte range, the operations further comprise:
in response to the electronic device determining that the data downloaded from the first CDN server is consistent with the data downloaded from the second CDN server, splicing the data downloaded from the first CDN server and the data downloaded from the second CDN server, to obtain the to-be-requested data; or
in response to the electronic device determining that the data downloaded from the first CDN server is inconsistent with the data downloaded from the second CDN server, sending a third HTTP request to the first CDN server, and sending a reset packet to the second CDN server, wherein the third HTTP request is used to request to download data that is in the to-be-requested data and that is not identified by the first byte range, and the reset packet is used to indicate to stop returning data to the electronic device.

* * * * *

UNITED STATES PATENT AND TRADEMARK OFFICE
CERTIFICATE OF CORRECTION

PATENT NO. : 11,997,328 B2  
APPLICATION NO. : 17/782157  
DATED : May 28, 2024  
INVENTOR(S) : Wang et al.

Page 1 of 1

It is certified that error appears in the above-identified patent and that said Letters Patent is hereby corrected as shown below:

On the Title Page

Page 2: Item (56) References Cited, Other Publications, Right-Hand Column, NPL Citation #11: "Bonavenure et al.," should read -- Bonaventure et al., --.

Signed and Sealed this  
Twenty-second Day of April, 2025

Coke Morgan Stewart  
*Acting Director of the United States Patent and Trademark Office*